United States Patent [19]

Hulyalkar et al.

[11] Patent Number: 5,841,484

[45] Date of Patent: Nov. 24, 1998

[54] BLIND EQUALIZER METHOD AND APPARATUS FOR HDTY TRANSMISSION USING AN NTSC REJECTION FILTER FOR MITIGATING CO-CHANNEL INTERFERENCE

[75] Inventors: Samir N. Hulyalkar, Columbia, Md.; Monisha Ghosh, Mohegan Lake, N.Y.

[73] Assignee: Philips Electronics North North America Corporation, New York, N.Y.

[21] Appl. No.: 887,406

[22] Filed: Jul. 2, 1997

Related U.S. Application Data

[63] Continuation of Ser. No. 576,546, Dec. 21, 1995, abandoned, which is a continuation-in-part of Ser. No. 230,360, Apr. 20, 1994, Pat. No. 5,512,957, which is a continuation-in-part of Ser. No. 197,773, Feb. 10, 1994, Pat. No. 5,452,015.

[51] Int. Cl.$^6$ ..................................................... H04N 5/21
[52] U.S. Cl. ........................ 348/607; 348/725; 348/914; 375/287; 375/232
[58] Field of Search ........................... 348/12, 607, 608, 348/609, 611, 614, 723, 725, 726, 914; 364/724.19, 724.2; 375/230, 231, 232, 233, 234, 235, 246, 350, 286, 287; H04N 5/21, 5/46

[56] References Cited

U.S. PATENT DOCUMENTS

| | | | |
|---|---|---|---|
| 5,263,033 | 11/1993 | Seshadri .................................... | 375/233 |
| 5,452,015 | 9/1995 | Hulyalker ................................. | 348/608 |
| 5,512,956 | 4/1996 | Hulyalkar ................................. | 348/607 |
| 5,517,263 | 5/1996 | Bhah et al. .............................. | 375/232 |
| 5,526,378 | 6/1996 | Knutsom et al. ....................... | 375/229 |
| 5,572,249 | 11/1996 | Ghosh ..................................... | 348/608 |
| 5,602,602 | 2/1997 | Hulyalkar ................................. | 348/607 |
| 5,648,822 | 7/1997 | Hulyalkar ................................. | 348/607 |

OTHER PUBLICATIONS

A Method of Self–Recovering Equaliztion for Multilevel Amplitude Modulation Systems, By Y. Sata in vol. COM–23, pp. 679–682, Jun. 1975.

VSB Transmission System: Technical Details, Feb. 18, 1994.

New Automatic Equalizer Employing Modulo Arithmetic, Electronic Letters, pp. 138–139, Mar. 1971, By M. Tomlinson.

Matched–Transmission Technique for Channels with Intersymbol Interference, IEEE Transactions on Communications, vol. COM–20, No. 4 pp. 774–780, Aug. 1972, by H.Harashima dn H. Miyakawa.

Liu et al, "Multiuser Blind Channel Estimation & Spatial Channel Equalization", ICASSP '95:Acoustics Speech & Signal Processing Sentence, vol. 3, pp. 1756–1759, May 1995.

Li, "Blind Deconvolution of Linear Systems w/ Nonstationary Discrete Inputs", Higher Order Statistics, 1993 Workshop, pp. 160–163, Jun. 1993.

Weerackody et al, "Dual–Mode Type Algorithms for Blind Equalization", IEEE Transactions on Communications, vol. 42, Issue 1, pp. 22–28, Jan. 1994.

*Primary Examiner*—Sherrie Hsia

[57] ABSTRACT

A blind-equalization method and apparatus are disclosed for equalization of a channel of an HDTV receiver. The HDTV receiver comprises a rejection filter corresponding to a precoder for which precoding is implemented at a television transmitter for combating co-channel interference, wherein the television transmitter transmits a digital television signal. The HDTV receiver further comprises an equalizer having an input and an output. The equalization method comprises the steps of initiating an equalization with a blind slicing mode. The method further comprises changing the equalization to a training sequence mode upon an occurrence of a no flutter condition. While in the training sequence mode, if a flutter condition occurs, then the equalization is returned to the blind slicing mode. A determination of the occurrence of the flutter condition is based upon an estimate of a negative derivative of the Signal-to-Noise Ratio (SNR) at the output of the equalizer, $dS_o$, being greater than a prescribed threshold.

44 Claims, 7 Drawing Sheets

BLIND EQUALIZER METHOD AND APPARATUS FOR HDTY TRANSMISSION USING AN NTSC REJECTION FILTER FOR MITIGATING CO-CHANNEL INTERFERENCE

CROSS-REFERENCE TO COPENDING APPLICATIONS

This is a continuation of application Ser. No. 08/576,546, filed Dec. 21, 1995, now abandoned which is a continuation-in-part of U.S. patent application Ser. No. 08/230,360, filed Apr. 20, 1994, U.S. Pat. No 5,512,957, entitled "Method and Apparatus for Combating Co-channel NTSC Interference for Digital TV Transmission" (attorney docket PHA 21,878), which is a continuation-in-part of application Ser. No. 08/197,773, filed Feb. 10, 1994, now U.S. Pat. No. 5,452,015, issued Sep. 19, 1995, entitled "Method and Apparatus for Combating Co-channel NTSC Interference for Digital TV Transmission" (attorney docket PHA 21,869), both of which are assigned to the assignee of the present invention, and further, the disclosures of which are incorporated by reference herein. Additional related applications include U.S. Ser. No. 08/271,810, filed Jul. 7, 1994, U.S. Pat. No. 5,572,249, entitled "Method and Apparatus for Optimal NTSC Rejection Filtering and Transmitter and Receiver Comprising the Same" (attorney docket PHA 21,894), U.S. Ser. No. 08/444,484, filed May 19, 1995, U.S. Pat. No. 5,648,822, entitled "Method and Apparatus for Combating Co-Channel NTSC Interference Using a Variable For Digital TV Transmission (attorney docket PHA 21,953), and U.S. Ser. No. 08/550,128, filed Oct. 27, 1995, U.S. Pat. No. 5,602,602, entitled "Method and Apparatus for Combating Co-Channel NTSC Interference For Digital TV Transmission Having a Simplified Rejection Filter" (attorney docket PHA 23,046), all assigned to the assignee of the present invention, and further the disclosures of which are incorporated by reference herein.

BACKGROUND OF THE INVENTION

1. Field of the Invention

This invention generally relates to a method and apparatus for combating co-channel NTSC interference for digital TV transmission, and more particularly, to the use of a blind equalizer in conjunction with an NTSC rejection filter for mitigating co-channel NTSC interference for digital TV transmission.

2. Discussion of the Related Art

The Federal Communications Commission (FCC) and cable television testing organizations, such as CableLabs, have been evaluating digital television delivery systems in order to choose a new television "standard" which someday will replace NTSC in the United States. These systems all involve digital coding and data compression techniques, for example those utilizing Motion Picture Experts Group (MPEG) algorithms or variations thereof.

The FCC plans to test and approve an advanced television (ATV) standard for terrestrial broadcasting comprising, for example, high definition television (HDTV) and standard definition (SDTV) digital signals for terrestrial broadcasting. Although the specifics of the standard are yet to be fully tested and agreed upon, the FCC has indicated that the system will initially take the form of a so called "simulcast" approach. The new HDTV signals will have to fit into currently unused television channels (so-called "taboo" channels) and initially co-exist with conventional analog television signals without co-channel interference.

NTSC will be used hereinafter to represent one example of conventional television broadcasting. Other examples would be SECAM and PAL. Although NTSC is exemplified herein, it is not meant to be construed as a limitation and will be used herein synonymously with "conventional" to represent conventional television in general.

In 1994, the FCC tested a so-called "Grand Alliance" system, a system which is being developed cooperatively by corporate sponsors thereof who were involved in a first round of individual proposals tested by the FCC in 1991 and 1992. This newly developed system proposes to take the best features from those systems already tested. This is being done in order to present a single optimum system for FCC approval as the U.S. standard.

The Grand Alliance has decided on a coding algorithm which will comply with the source coding standards proposed by the MPEG. In addition, an RF transmission approach developed by Grand Alliance member Zenith Electronics Corporation was selected by the Grand Alliance. The RF transmission approach utilizes multi-level vestigial sideband (VSB) modulation which is described in "VSB Transmission System: Technical Details", Feb. 18, 1994.

The parent application, U.S. patent application Ser. No. 08/230,360, filed Apr. 20, 1994, entitled "Method and Apparatus for Combating Co-channel NTSC Interference for Digital TV Transmission", from which the instant application depends, describes an improved approach to combatting co-channel interference. The approach described in U.S. Ser. No. 08/230,360 utilizes an optimal NTSC "rejection filter" at the receiver in conjunction with an optimal precoder at the transmitter. The use of such a combination of a "rejection" filter and precoder is in contrast to a use of a comb filter in a receiver as proposed by Zenith. The approach of the parent application solves a number of problems and improves performance when both co-channel NTSC and additive white Gaussian noise (AWGN) are present. In addition, a method of using a generalized precoder and a corresponding decoder, for the case when uncoded QAM/VSB modulation is used, is described in "New Automatic Equalizer Employing Modulo Arithmetic", Electronic Letters, pp. 138–139, March 1971, by M. Tomlinson and in "Matched-Transmission Technique for Channels With Intersymbol Interference", IEEE Transactions on Communications, vol. COM-20, no. 4, pp. 774–780, Aug. 1972, by H. Harashima and H. Miyakawa.

While an improved overall performance of a transmitter/receiver system can be obtained when utilizing an optimal NTSC rejection filter and an associated precoder, it is however at the expense of some performance when only AWGN is present (for example 0.3 dB for a 36-tap filter). This loss in performance is due to the fact that the NTSC rejection filter is implemented in the receiver at the decoder, which causes noise enhancement as a result of noise also passing through the NTSC rejection filter in the receiver. Optimal rejection filters with the proposed constraints are discussed further in the parent application and also in U.S. patent application Ser. No. 08/271,810, filed on Jul. 7, 1994.

The presence of the rejection filter in a receiver changes the way in which equalization is done at the receiver. The function of an equalizer in the receiver is to compensate for the effects of multipath, wherein multipath is characterized by a signal taking multiple paths on route from a transmitter to a receiver. Henceforth, "channel" as used herein shall refer to this multipath, which is a linear distortion on the signal. For the Grand Alliance VSB transmission scheme, the presence of the training sequence or the field sync provides the receiver with a reference which can then be used to train the equalizer in an initial period (i.e., trained equalization). A method of training an equalizer using a training sequence is described briefly in the parent application and in further detail in U.S. patent application Ser. No. 08/550,128, filed Oct. 27, 1995 (Attorney Docket PHA 23,046).

The method of trained equalization is very effective when the channel does not change (i.e., static multipath), or when channel changes are slow compared to the repetition-rate of the training sequence. Unfortunately, there are times when channel changes can be extremely fast, for example, when an airplane passes over the receiver antenna. Such an occurrence of an airplane passing over the receiver antenna is known as the airplane flutter problem. During these times in which the channel changes are faster than the repetition-rate of the training sequence, it is useful to train "blindly" as described for instance in "A Method of Self-Recovering Equalization for Multilevel Amplitude Modulation Systems," by Y. Sato in vol. COM-23, pp. 679–682, Jun. 1975, and in "Zenith Description for Adaptive Equalization," Apr. 29, 1994.

The Grand Alliance method of blind-equalization, as discussed briefly herein below and more fully described in "Zenith Description for Adaptive Equalization", cannot be used directly for the case when an NTSC rejection filter is used at the receiver with a precoder at the transmitter. Problems with the Grand-Alliance blindequalization method are thereafter pointed out in the description to follow, as well as, a description of a reason why the Grand-Alliance blind-equalization method cannot be used for the case when an NTSC rejection filter is used at the receiver along with a precoder used at the transmitter.

Description of the Grand-Alliance Blind-Equalization Method

The general philosophy behind the blind-equalization algorithm is as follows. In most scenarios except for time-varying multipath or airplane flutter, it is better to equalize the channel using only the field sync or a training sequence. Equalization of the channel using only the field sync or a training sequence is, henceforth, termed as the training mode. When channel changes are faster than the interval between training sequences, a continued operation in the training mode results in significant performance degradation. In the later case, it is desirable to switch to a blind-mode of operation (i.e., a blind-equalization mode).

Referring now to FIG. 1, the Grand-Alliance (GA) blind-equalization method shall be described. In an equalizer of the GA HDTV system, an equalization of the channel begins with a start-up mode 10. Start-up mode 10 defaults to a blind-mode using binary slicers, i.e., mode 12. The mode of binary-level slicing, as well as using binary slicers and their operation, is known in the art, as described in detail, for example, in "Zenith Description for Adaptive Equalization". As shown in FIG. 1, blind equalization is carried out via modes 12, 14, and 16, as will be discussed further herein. The training mode is represented by reference numeral 18. In continuation of the above discussion of blind-equalization, when a signal-to-noise ratio (SNR) at the output of the equalizer (represented by $S_o$) is higher than the SNR at the input of the equalizer (represented by $S_i$) by a certain threshold, $T_1$, a decision is made to change from the binary-level slicing mode 12 to a four-level slicing mode 14. The expression used for the decision to change from mode 12 to mode 14 is given by ($S_o-S_i>T_1$). It is noted that the SNR at the output of the equalizer, $S_o$, is typically measured during the time in which a training sequence is received.

Similarly, a transition from four-level slicing 14 to eight-level slicing 16 is made by checking to see whether equalizer-output SNR, $S_o$, is greater than the equalizer-input SNR, $S_i$, by a second threshold $T_2$. The expression used for making the decision to change from mode 14 to mode 16 is given by $(S_o-S_i>T_2)$. In either of these two modes, 14 and 16, respectively, if it is observed that the transition from one mode to the next resulted in or caused a difference between the output SNR and the input SNR to drop below a certain threshold, given by the expression $(S_o-S_i<T_1)$, then an automatic transition is made back to the binary-slicing mode 12. It is noted that the second threshold $T_2$ is greater than the first threshold $T_1$. Furthermore, values for the thresholds are determined, for instance, by simulations of channel models or, in the field, during an installation of an HDTV system.

Referring still to FIG. 1, to switch from the blind mode (i.e., 12, 14, or 16) to the trained mode (i.e., 18), a measure on the speed of a change in multipath (i.e., channel change) is determined. The measure of the speed of the channel change is shown as FC (flutter condition) in FIG. 1. This measure can be obtained by first computing the square of the difference between the samples corresponding to the training sequences which are adjacent to each other at the equalizer input. The FC measure also computes the square of the difference between the samples corresponding to every other training sequence, i.e., between training sequences separated by one training sequence. The rationale for computing the difference is that the static multipath, corresponding to the training sequence, will get cancelled by computing the difference and the only terms that remain are the terms corresponding to time-varying multipath and noise. By computing the difference between the SNR obtained for the adjacent training sequence samples, given by the expression "$S_i(TR(n+1)-TR(n))$" and the SNR obtained for the training sequence samples which are separated by one training sequence, given by the expression "$S_i(TR(n+2)-TR(n))$", the noise effects can be eliminated and only the time-varying multipath terms remain. The difference, given by the expression "$S_i(TR(n+2)-TR(n))-S_i(TR(n+1)-TR(n))$", is then compared to a certain threshold, represented by $T_3$, to determine whether the blind-mode must be used or not. For instance, when a flutter condition exists (i.e., FC On), the expression given by "$S_i(TR(n+2)-TR(n))-S_i(TR(n+1)-TR(n))<T_3$" is satisfied and the blind-mode must be used. Furthermore, during a training sequence, if a flutter condition exists, a transition is made from the training mode 18 to the binary-level slicing mode 12 of the blind mode.

Problems With the Grand-Alliance Method of Determination of FC

The static multipath (i.e., the channel) corresponding to random data received before the training sequence will not be cancelled by the GA approach of computing the difference between the training sequences. It is observed that this problem may be alleviated by ignoring the training sequence samples corresponding to the samples which may be affected by the static multipath. For example, if it is assumed that the maximum multipath duration is 20 $\mu$sec, then the first 200 samples of the training sequence may be ignored (corresponding to a sampling rate of approximately 10 samples per $\mu$sec). This, however, is at the expense of reduced reliability of the SNR estimate.

With the Grand-Alliance system, if co-channel interference is present, the co-channel interference will produce different additive interference effects on different training sequences at the input to the equalizer. Such effects on the training sequences are highly undesirable with respect to the determination of the flutter condition. In addition, any nonstationary noise, for example, impulsive noise, will also create a problem to the determination of the flutter condition.

Why the Grand-Alliance Method of Computing FC cannot be Used When an NTSC Rejection Filter is Used FIGS. 2 and 3 illustrate the effect of sending any data sequence over a multipath channel for (i) the case when no filter is used (i.e., no preceding occurs at the transmitter and no rejection filter is used at the receiver) and (ii) the case when a filter is used (i.e., precoding occurs at the transmitter and a rejection filter is used at the receiver), respectively. If $S(z)$ represents the data symbols expressed in a polynomial form and $H(z)$ the channel response, then the received sequence $R(z)$ is calculated as $H(z)S(z)$ for the case when no filter is used (FIG. 2). When an NTSC rejection filter is used, the combination of the modulo-precoding at the transmitter and the filtering at the receiver causes the received sequence $R(z)$ to be equal to $H(z)(S(z)-b(z)M)$, where $b(z)$ is a sequence of integers. With respect to the term $b(z)$, the term $b(z)$ also indicates the times a Modulo-M reduction takes place in the transmitter with respect to the modulo-precoding (FIG. 3). For instance, if $b(z)$ equals zero, then no Modulo-M reduction took place, otherwise the value of $b(z)$ indicates the number of times of the Modulo-M reduction.

Let us now consider effects due to the training sequence on FC determination as a result of preceding. For this consideration, assume that $S(z)$ alone comprises the training sequence. The system of FIG. 3 produces a new received training sequence $S'(z)$ which is equal to the sequence $S(z)-b(z)M$. Since $S(z)$ is a known binary training sequence (i.e., known to the receiver), the receiver can estimate the value of $b(z)$ by slicing between the possible received levels $S(z)-b(z)M$. Thus, in effect the sequence $S'(z)$ can be estimated at the receiver. However, since the quantity $b(z)$ is dependent on the random data preceding the training sequence, the value of $S'(z)$ for training sequences which are sent at different times will not be identical. This poses a problem for the GA FC determination where it is assumed that the received training sequence is the same at all times.

SUMMARY OF THE INVENTION

An object of the present invention is to overcome the problems in the art discussed above.

An object of the present invention is to provide a method and apparatus of blind equalization for use in a receiver, the receiver having an NTSC rejection filter corresponding to a precoder for which precoding is implemented at the transmitter, for providing an improved performance when both a co-channel interference as well as an additive noise are present.

According to the present invention, a method for blind-equalization of a channel of an HDTV receiver is disclosed. The HDTV receiver is characterized by a rejection filter corresponding to a precoder for which precoding is implemented at a television transmitter for combating co-channel interference. The television transmitter transmits a digital television signal over the channel. The HDTV receiver is further characterized by an equalizer, the equalizer having an input and an output. Accordingly, the method of blind equalization comprises the steps of initiating an equalization with a blind slicing mode and changing the equalization to a training sequence mode upon an occurrence of a no flutter condition. Upon an occurrence of a flutter condition, the equalization is returned from the training sequence mode to the blind slicing mode. A determination of the occurrence of the flutter condition is based upon an estimate of a negative derivative of the Signal-to-Noise Ratio (SNR) at the output of the equalizer, $dS_o$, being greater than a prescribed threshold.

In addition, according to the present invention, an equalizer for blind-equalization, a method of receiving a television signal including blind equalization, and a television receiver incorporating an equalizer for blind-equalization are also disclosed herein.

BRIEF DESCRIPTION OF THE DRAWINGS

The foregoing and other teachings and advantages of the present invention will become more apparent upon a detailed description of the best mode for carrying out the invention as rendered below. In the description to follow, reference will be made to the accompanying drawings in which like reference numerals are carried forward, and in which.

DETAILED DESCRIPTION OF THE PREFERRED EMBODIMENTS

Figure 4:
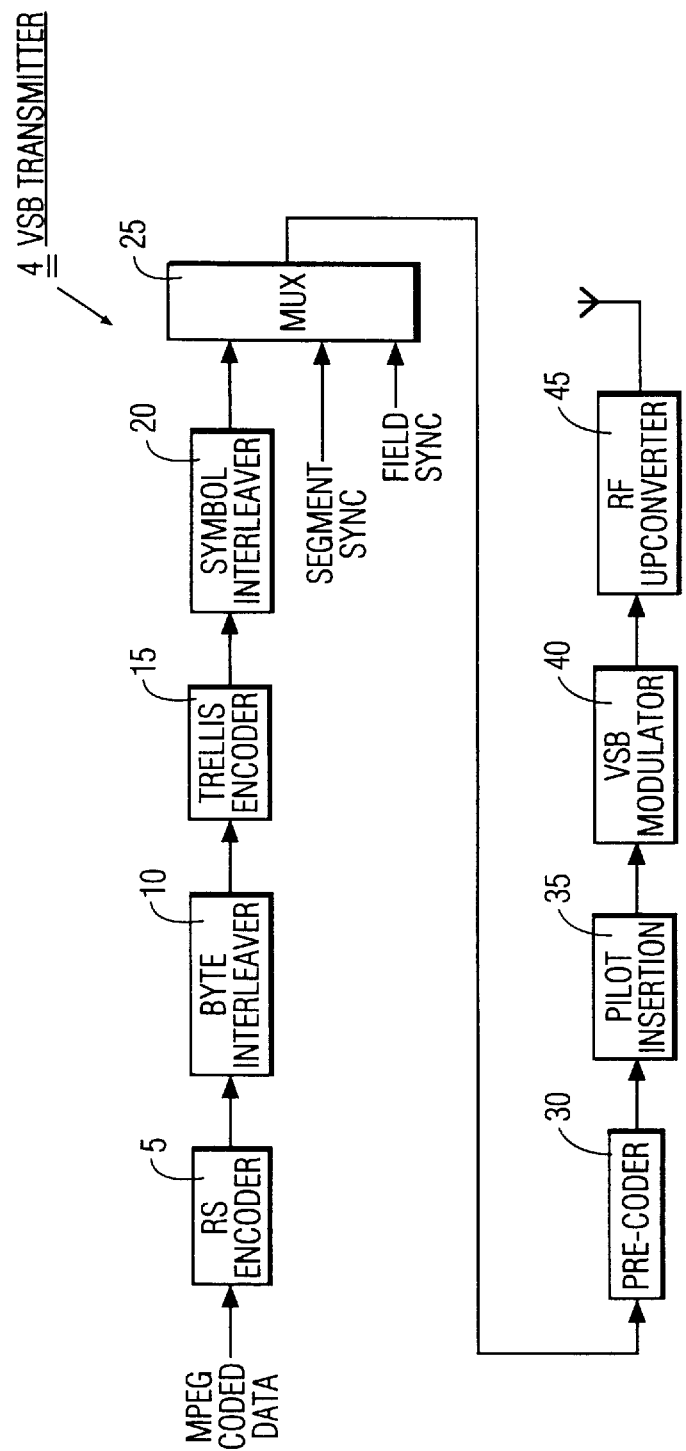
FIG. 4 shows block diagram of a VSB transmitter.

Referring now to FIG. 4, a VSB HDTV transmitter 4 comprising an encoding/transmission system, as disclosed in the parent application, is shown in block diagram form. Such a transmitter operates to transmit an encoded digital television signal. That is, digital data (for example, comprising MPEG encoded television) is passed through a Reed-Solomon (RS) encoder 5, a byte interleaver 10, a trellis encoder 15, and a symbol interleaver 20. The output of the symbol interleaver 20 is passed through a multiplexer (MUX) 25. MUX 25 also multiplexes any training signals, for example, segment sync or field sync symbols, that are present in accordance to a particular sequence being transmitted. The blocks 5, 10, 15, 20, and 25 are known in the art, such as described in "VSB Transmission System: Technical Details", for example, and thus only briefly discussed herein.

The output of MUX 25 comprises a multiplexed data stream which is then sent through a precoder 30. Precoder 30 precodes the data stream, thus providing a precoded output data stream at its output. Precoder 30 comprises a precoder, such as is disclosed in the parent application, for providing a desired precoding for implementation at the transmitter. The precoded output is then passed through a pilot insertion means 35. The output of the pilot insertion means 35 is then passed through a VSB modulator 40, and lastly, a radio frequency (RF) upconverter 45. RF upconverter 45 upconverts the digital television signal input thereto and causes the digital television signal to be radiated over a predetermined HDTV terrestrial channel. Pilot insertion means 35, VSB modulator 40, and RF upconverter 45 are also known in the art, as described for example in "VSB Transmission System: Technical Details", and thus only briefly discussed herein.

Figure 5:
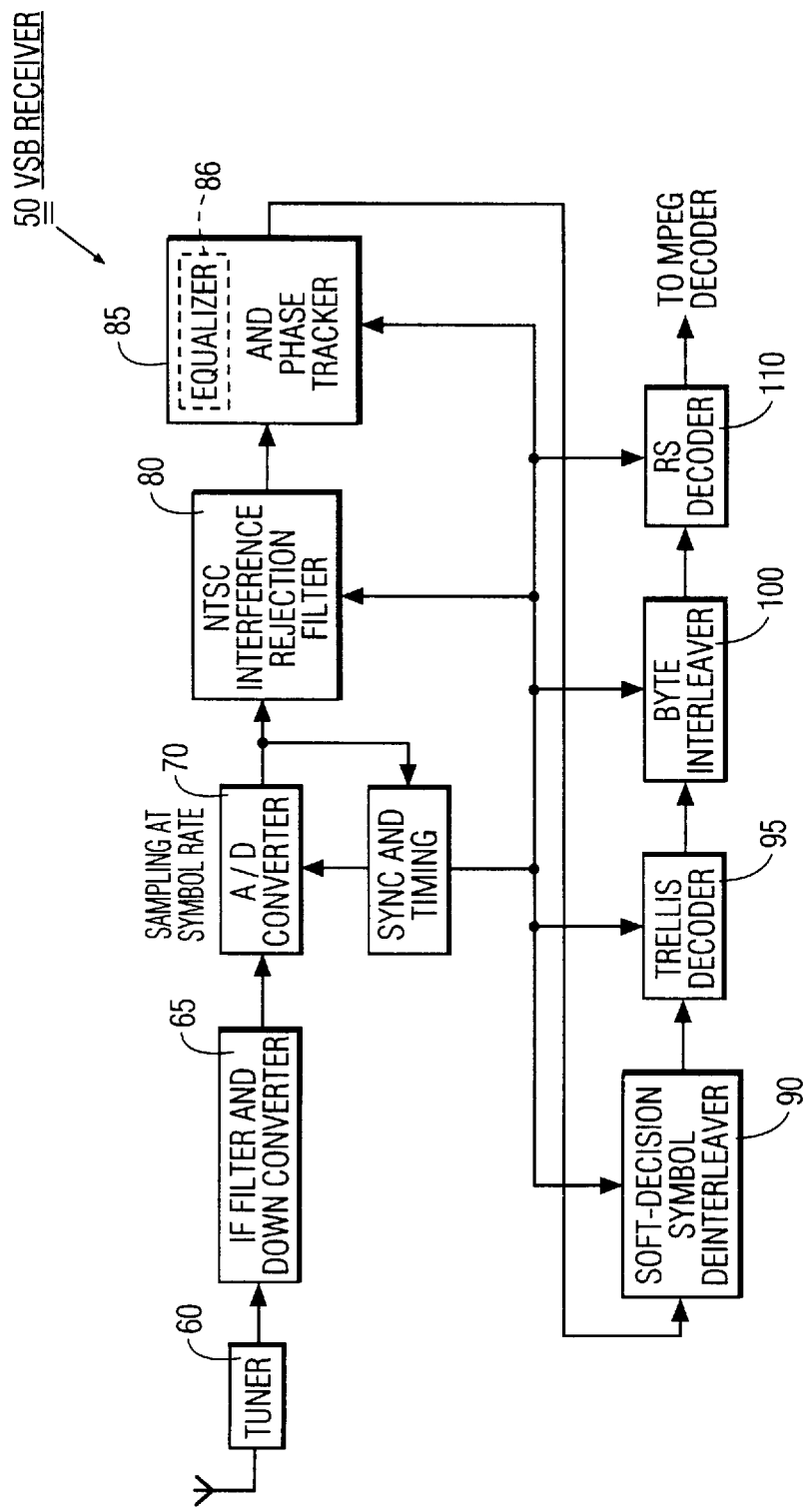
FIG. 5 shows a block diagram of a VSB receiver having a co-channel interference filter and equalizer in accordance with the present invention.

Turning now to FIG. 5, a VSB receiver 50 is shown in block diagram form. Receiver 50 comprises a tuner 60 which selects an HDTV channel of interest and converts a received signal from RF to intermediate frequency (IF). The received signal (i.e., the output of tuner 60) is sent to an IF filter and downconverter 65. IF filter and downconverter 65 comprises an IF filter to filter, i.e., shape, the signal spectrum of the received signal according to the filter used in the VSB modulator 40 of transmitter 4. IF filter and downconverter 65 further comprises a mixer which downconverts the filtered signal into a baseband signal. The blocks 60 and 65 are known in the art and thus only briefly discussed herein. Referring still to FIG. 5, an analog-to-digital (A/D) converter 70 samples the output signal of IF filter and downconverter 65 at a desired symbol-rate, for example, 10.76 MHz. The output of the A/D converter is passed through an NTSC rejection filter 80. NTSC rejection filter 80 comprises a rejection filter for which precoding was implemented at the transmitter 4, further as described, for example, in the parent application. The output of rejection filter 80 is then passed to an input of equalizer and phase tracker 85, the equalizer 86 of which will be described in more detail with respect to FIG. 6. The equalizer and phase tracker output is passed through a soft-decision symbol deinterleaver 90, a trellis-decoder 95, a byte deinterleaver 100, and an RS decoder 110. Symbol deinterleaver 90, trellis-decoder 95, byte deinterleaver 100, and RS decoder 110 are known in the art, as described for example in "VSB Transmission System: Technical Details", and thus only briefly discussed herein. A synchronizing and timing block 72 controls a clocking for each of the digital signal processing blocks (as indicated in FIG. 5) and also the A/D converter 70.

Equalization is simplified as a result of a training sequence or a field sync, for example, as is present in a received HDTV signal, or as provided by a training sequence generator. Such a training sequence or a field sync is sent by the Grand Alliance VSB transmission scheme as described in "VSB Transmission System: Technical Details". As discussed herein above, the training sequence provides the receiver with a reference which can then be used to train the equalizer in an initial training period.

Figure 6:
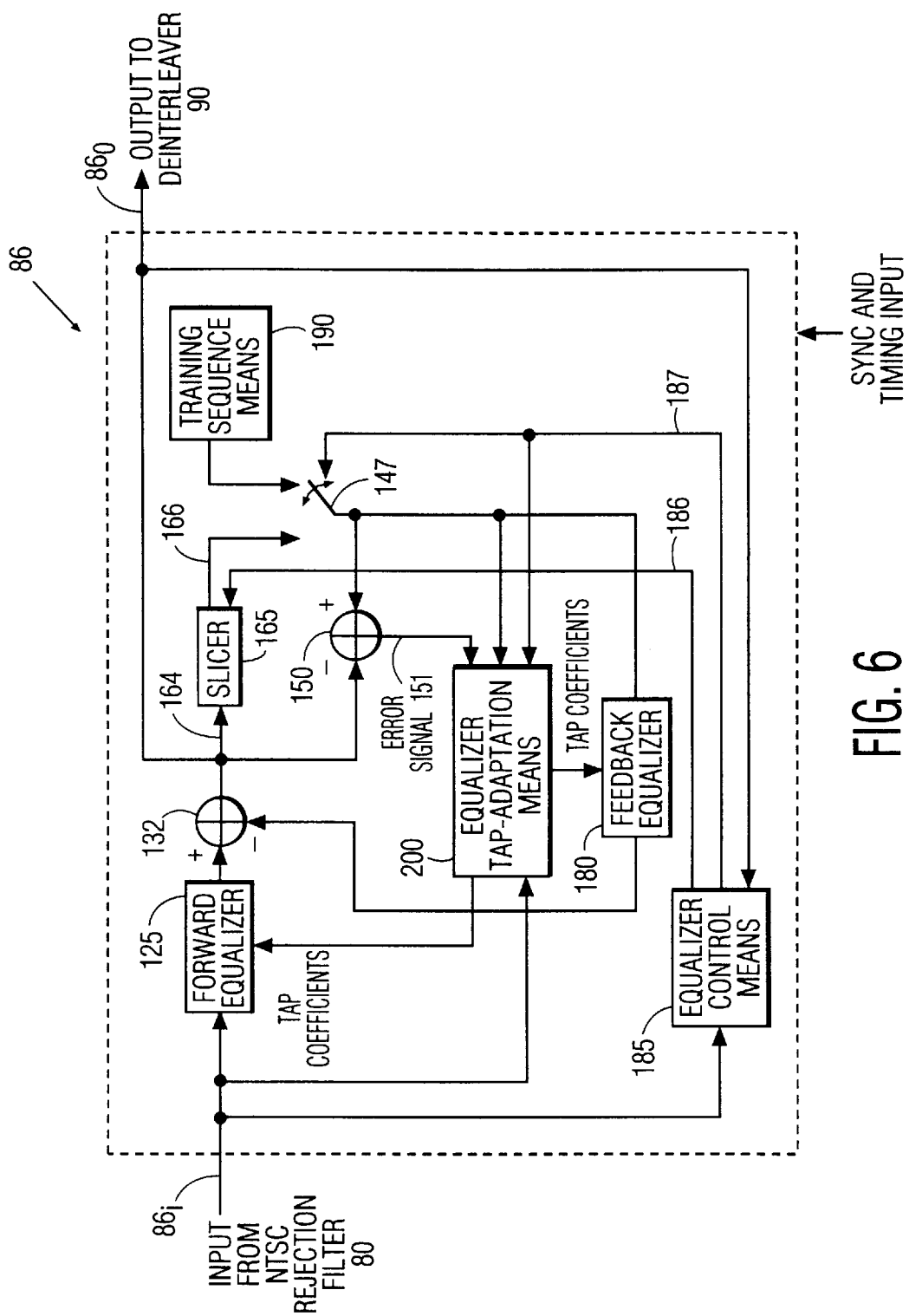
FIG. 6 is illustrative of an equalizer, including a slicer, in accordance with the present invention.

Referring now to FIG. 6, equalizer 86 of receiver 50 (FIG. 5) is shown in greater detail. Briefly, an output of the NTSC rejection filter 80 is input at equalizer input $86_i$ and passed through a forward equalizer 125, wherein the output of the forward equalizer 125 contains residual intersymbol interference introduced by the selected HDTV channel. The residual intersymbol interference is removed through the use of a feedback equalizer 180 and subtracter 132. That is, the output of feedback equalizer 180 is subtracted from the output of forward equalizer 125 via subtracter 132. The output of subtracter 132 comprises the output $86_o$ of equalizer 86, wherein the output of the equalizer 86 is sent to the soft-decision symbol deinterleaver 90 and then the trellis decoder 95 as shown in FIGS. 5 and 6.

Referring still to FIG. 6, equalizer 86 further includes a slicer 165. Slicer 165 is included as a result of pre-coding at the transmitter 4 (FIG. 4). The output of subtracter 132 is connected to the input 164 of slicer 165. Briefly, slicer 165 operates on a symbol constellation which is the output of the trellis encoder 15 of transmitter 4. The input 164 and output 166 of slicer 165 are passed through a subtracter 150 (FIG. 6), which outputs an error signal on signal line 151. The output 166 of slicer 165 is further passed to the feedback equalizer 180 via a controllable switching means 147, as appropriate, as will be explained further herein below. Equalizer 86 further includes a training sequence generator means 190 for providing a training sequence during a training period. Controllable switching means 147 comprises any suitable controllable switch. Controllable switching means 147 is utilized for switching at its output between either (i) an output of training sequence means 190 during a training period or (ii) an output of slicer 165 when data is received, further as described herein below.

Equalizer 86 further comprises an equalizer tap-adaptation means 200 for implementing an equalizer tap-adaptation algorithm, the equalizer tap-adaptation algorithm producing modified taps (i.e., tap-coefficients) to be used by the forward and feedback equalizers 125 and 180, respectively. Equalizer tap-adaptation means 200 preferably comprises a tap-adaptation circuit which operates on a least-means-squares algorithm, such as is described for example in "Digital Communication", by E. A. Lee and D. G. Messerschmitt, published by Kluwer Academic Publishers in 1988. While the tap-adaptation circuit operates on an LMS algorithm, other tap-adaptation circuits can also be used. In particular, equalizer tap-adaptation means 200 provides modified taps in response to respective inputs of the forward and feedback equalizers, 125 and 180, respectively, further in addition to an input in the form of an error signal received via signal line 151. Equalizer tap-adaptation means 200 utilizes a difference between an input of slicer 165 and an output of either (i) the slicer 165 or (ii) the training sequence means 190 as an error signal in modifying the taps of the forward and the feedback equalizers 125 and 180, respectively, as shown. The output of switch 147 is connected to the plus input of subtracter 142, wherein a desired input of switch 147, i.e., either the output of slicer 145 or the training sequence output of means 190, is provided to subtracter 150, as appropriate, for use in generating the error signal input of equalizer tap-adaptation means 200. The equalizer tap-adaptation algorithm of means 200 thus operates upon the error signal and the respective inputs of the forward and feedback equalizers for producing modified taps (i.e., tap-coefficients) to be used by the forward and feedback equalizers 125 and 180, respectively. Use of such modified taps or tap-coefficients in equalizer 86, in conjunction with the rejection filter 80, yield an acceptable overall performance in receiver 4.

Referring still to FIG. 6, an equalizer control means 185 is provided for implementing a prescribed strategy for performing blind-equalization in accordance with the present invention, as will be discussed further with respect to FIG. 8. One input of equalizer control means 185 is connected to the input $86_i$ of equalizer 86 and another input of equalizer control means 185 is connected to the output $86_o$ of equalizer 86. Equalizer control means 185 is responsive to the input and output of equalizer 86, and further responsive to a sync and timing input from sync and timing means 72, for providing appropriate control signals for performing blind-equalization in accordance with the present invention. A first control signal output 186 of equalizer control means 185 is connected to a control input of slicer 165. A second control signal output 187 of equalizer control means 185 is connected to a control input of controllable switching means 147, the output 187 further being connected to a control input of equalizer tapadaptation means 200. During the mode of trained equalization, equalizer control means 185 outputs an appropriate control signal to equalizer tap-adaptation means 200 for suppressing the tap-adaptation means 200 subsequent to a training sequence when data is being received. That is, during the mode of trained equalization, when data is being received there is no training sequence and tap-adaptation means 200 is made inoperative and thus stops adapting, wherein the tap coefficients remain the same during the period in which there is no training sequence. During the mode of blind equalization, however, equalizer control means 185 outputs an appropriate control signal to equalizer tap-adaptation means 200 to facilitate tap-adaptation during receipt of data also, in comparison to the mode of trained equalization. Equalizer control means 185 can comprise any suitable device, such as a microprocessor, microcontroller, and/or discrete circuitry for implementing the desired functions in accordance with known programming and circuit design techniques, for performing appropriate calculations and functions and further for outputting appropriate control signals in response thereto, further as described herein below.

Figure 7:
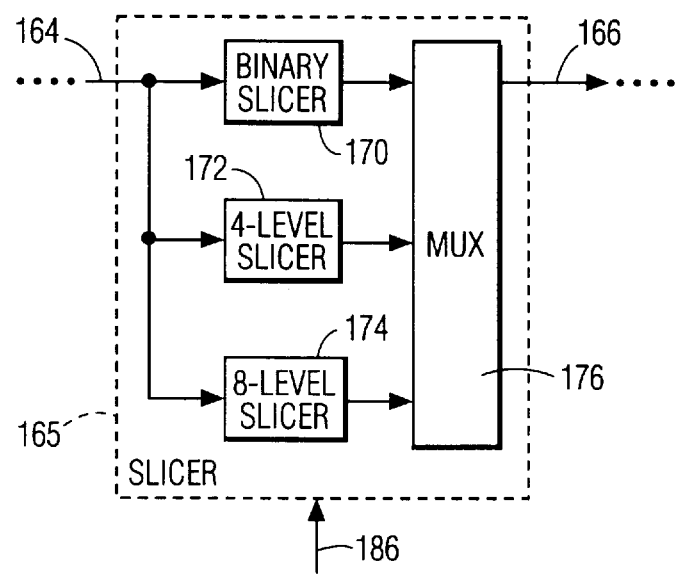
FIG. 7 is illustrative of the slicer of FIG. 6 in further detail in accordance with the present invention.

Turning now to FIG. 7, an embodiment of slicer 165 is illustrated in further detail. Slicer 165 can comprise, for example, a plurality of blocks for performing various levels of slicing. For instance, block 170 represents a binary-level slicer for performing binary-level slicing on its input. Block 172 represents a four-level slicer for performing 4-level slicing on its input. Similarly, block 174 represents an eight-level slicer for performing 8-level slicing on its input. An output of each of the plurality of blocks, 170, 172, and 174 is connected to an input of a multiplexer 176, for selectively outputting a desired one of the outputs of blocks 170, 172, or 174 as an output of slicer 165, in accordance with the present invention. Further as indicated herein above with respect to slicers and slicing operations, binary-level slicing, 4-level slicing, and 8-level slicing are known in the art and thus only briefly discussed herein. While slicer 165 has been shown as a plurality of blocks for performing various levels of slicing, slicer 165 may likewise comprise a single block for performing a desired level of slicing (e.g., binary-level slicing).

The operation of equalizer 86 and the method in accordance with the present invention will now be discussed. In accordance with the present invention, unlike the GA FC determination method, the equalizer-output SNR is used to determine the flutter condition. By using the equalizer-output SNR, most of the problems outlined herein above are either solved or reduced significantly (with the exception of impulsive noise). Furthermore, by noting whether or not the equalizer-output SNR is decreasing significantly, it can be accurately determined whether the equalizer can handle the time-varying channel effects. That is, if the negative derivative of the equalizer-output SNR is above a certain value, then a transition is made from the training sequence mode to the blind mode. Stated alternatively, if the negative derivative of the equalizer-output SNR is decreasing at a rate greater than the certain value, then the equalizer is unable to track the time-varying multipath signal (i.e., channel) and the blind mode must be used. FIG. 8 shows, in detail, a flow diagram of the method of blind-equalization in accordance with the present invention for the case when an NTSC rejection filter is used. In addition, two expressions for calculating the negative derivative of the output SNR are provided, which are based on the least-squares approximation of the derivative using first-order and second-order polynomials, respectively. Other suitable approximations for implementing the derivative can be used as well.

Figure 8:
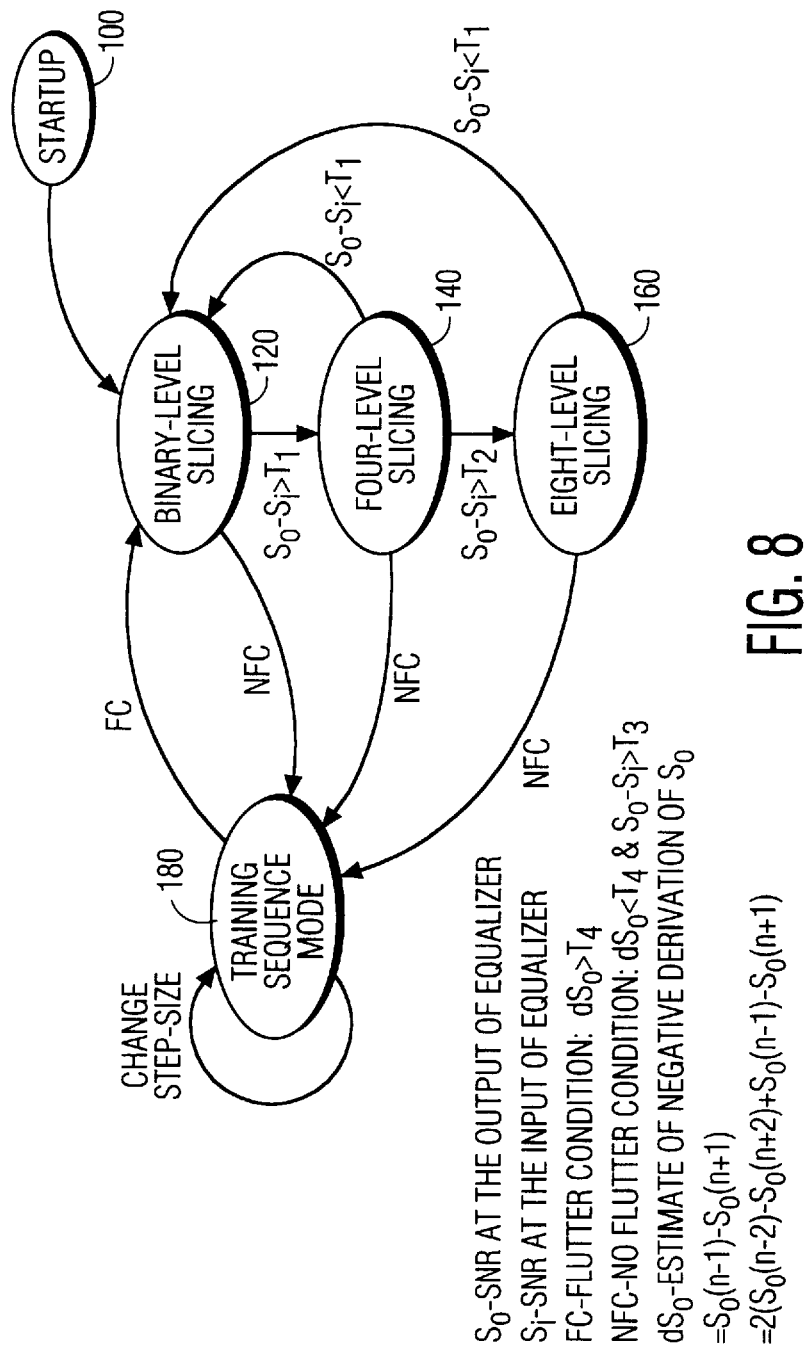
FIG. 8 is a flow diagram of the method of blind equalization in accordance with the present invention.

Referring now to FIG. 8, the blind-equalization method according to the present invention shall be described. In equalizer 86, an equalization of the channel begins with a start-up mode 100. Start-up mode 100 defaults to a blind-mode using binary slicers, i.e., mode 120. Blind equalization is carried out via modes 120, 140, and 160. The training mode is represented by reference numeral 180. During the blindequalization mode, when a signal-to-noise ratio (SNR) at the output $86_o$ of the equalizer 86 (represented by $S_o$) is higher than the SNR at the input $86_i$ of the equalizer (represented by $S_i$) by a certain threshold, $T_1$, a decision is made to change from the binary-level slicing mode 120 to a four-level slicing mode 140. The expression used for the decision to change from mode 120 to mode 140 is given by ( $S_o-S_i>T_1$). It is noted that the SNR at the output of the equalizer, $S_o$, is typically measured during the time in which a training sequence is received. Similarly, a transition from four-level slicing 140 to eight-level slicing 160 is made by checking to see whether equalizer-output SNR, $S_o$, is greater than the equalizer-input SNR, $S_i$, by a second threshold $T_2$. The expression used for making the decision to change from mode 140 to mode 160 is given by ($S_o-S_i>T_2$ ). In either of these two modes, 140 and 160, respectively, if it is observed that the transition from one mode to the next resulted in or caused a difference between the output SNR and the input SNR to drop below a certain threshold, given by the expression ($S_o-S_i<T_1$ ), then an automatic transition is made back to the binary-slicing mode 120. It is noted that the second threshold $T_2$ is greater than the first threshold $T_1$. Furthermore, values for the thresholds are determined, for instance, by simulations of channel models or, in the field, during an installation of an HDTV system. Calculations of $S_i$ and $S_o$ and the evaluation of the given expressions are carried out via equalizer control means 185. In addition, appropriate control signals are output by equalizer control means 185 to slicer 165 for changing between various slicing modes during blind equalization.

Referring still to FIG. 8, to switch from the blind mode (i.e., 120, 140, or 160) to the trained mode (i.e., 180), a measure on the speed of a change in multipath (i.e., channel change) is determined. The measure of the speed of the channel change is shown as FC (flutter condition) in FIG. 8. In accordance with the present inventions, this measure is obtained by an estimate of the negative derivative $dS_o$ of the SNR at the output of equalizer 86. A first estimate of the negative derivative $dS_o$ of the SNR at the output of equalizer 86 can be obtained based upon a least-squares approximation of the derivative using first-order polynomials. That is, the first estimate can be represented by the expression $dS_o=S_o(n-1)-S_o(n+1)$, where $S_o(n-1)$ and $S_o(n+1)$ are samples of the SNR at the equalizer output separated by one sequence sample, $S_o(n)$. A second estimate of the negative derivative $dS_o$ of the SNR at the output of equalizer 86 can be obtained based upon a least-squares approximation of the derivative using second-order polynomials. That is, the second estimate can be represented by the expression $dS_o= 2(S_o(n-2)-S_o(n+2))+S_o(n-1)-S_o(n+1)$, where $S_o(n-1)$ and $S_o(n+1)$ are samples of the SNR at the equalizer output separated by one sequence sample $S_o(n)$, and where $S_o(n-2)$ and $S_0(n+2)$ are samples of the SNR at the equalizer output separated by three sequence samples $S_o(n-1)$, $S_o(n)$, and $S_o(n+1)$. The estimate of the negative derivative $dS_o$ of the SNR at the output of equalizer 86 is then compared to a certain threshold, represented by $T_4$, to determine whether the blind-mode must be used or not. For instance, when a flutter condition (FC) exists, the expression given by ($dS_o>T_4$) is satisfied and the blind-mode must be used. Furthermore, during a training sequence, if a flutter condition exists, a transition is made from the training mode 180 to the binary-level slicing mode 120 of the blind mode. For a no flutter condition determination, the conditions given by the expressions ($dS_o<T_4$) and ($S_o-S_i>T_3$) must be satisfied.

Figure 1:
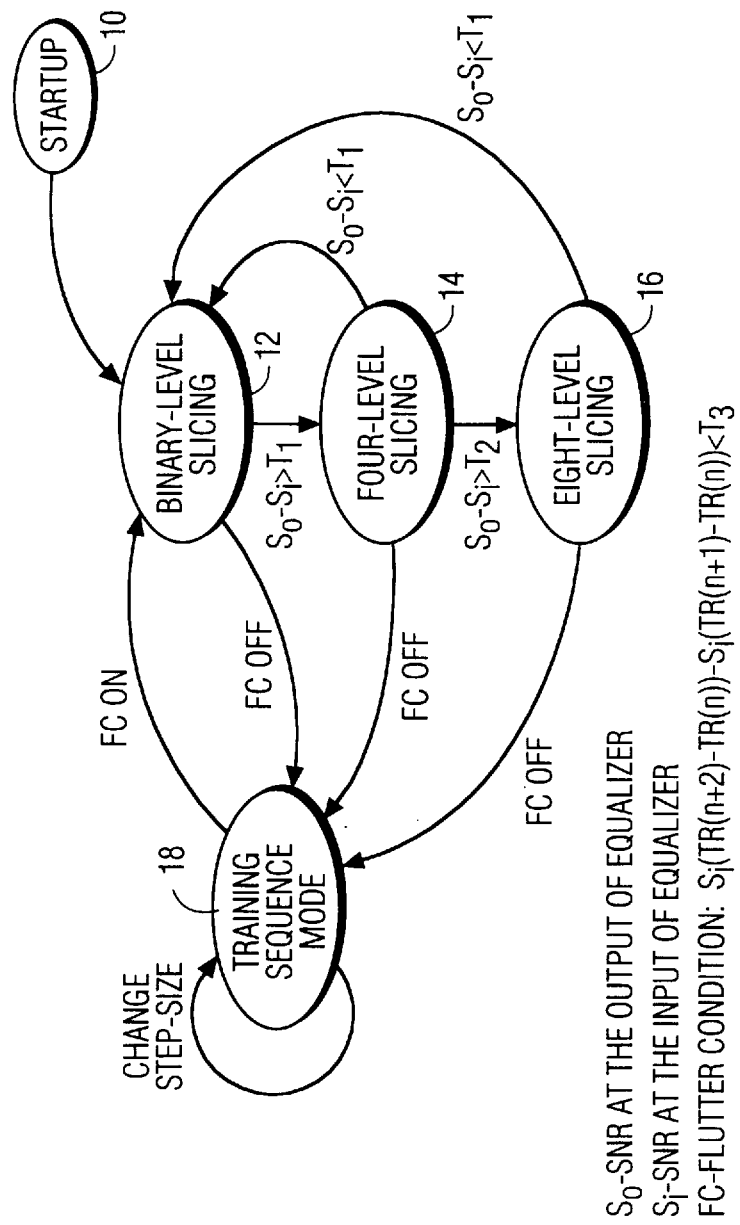
FIG. 1 is a flow diagram of blind equalization known in the art.
Figure 2:
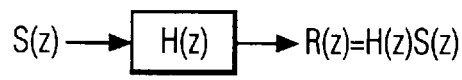
FIG. 2 shows a block diagram of a system in which no preceding occurs at the transmitter and for which no rejection filter is used at the receiver.
Figure 3:
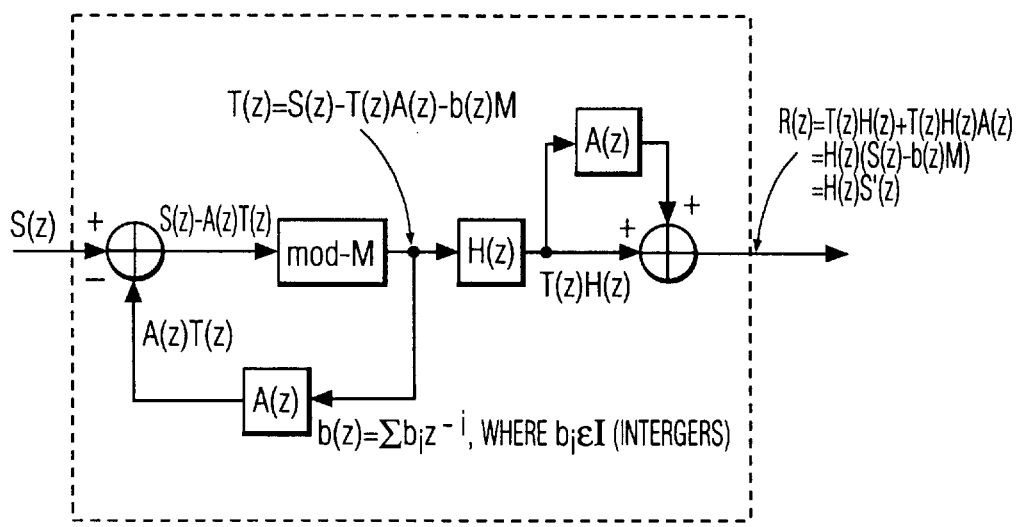
FIG. 3 shows a block diagram of a system in which precoding occurs at the transmitter and for which a rejection filter is used at the receiver.

It is noted that the third threshold $T_3$ is greater than the second threshold $T_2$. Furthermore, as noted above, values for the thresholds are determined, for instance, by simulations of channel models or, in the field, during an installation of an HDTV system. It is further noted that values for the thresholds as shown in FIG. 8 can be different from those shown in FIG. 1. In addition, equalizer control means 185 performs further calculations (i.e., the derivative of $S_o$) and evaluation of the given expressions. Still further, appropriate control signals are output by equalizer control means 185 to implement a transition between the training mode and the blind equalization mode, as determined by an outcome of the evaluation of the negative derivative of $S_o$ and the other expressions.

A blind-equalization method for use when a rejection filter is used at the receiver has thus been described. A metric using the SNR at the output of the equalizer is used which eliminates or reduces several problems associated with the Grand-Alliance blind-equalization algorithm.

While the invention has been particularly shown and described with reference to the preferred embodiment thereof, it will be understood by those skilled in the art that various changes in form and detail may be made therein without departing from the spirit and scope of the invention.

What is claimed is:

1. A blind-equalization method for equalization of a channel of a digital television receiver, the digital television receiver having a rejection filter corresponding to a precoder for which precoding is implemented at a television transmitter for combating co-channel interference, the television transmitter for transmitting a digital television signal, the digital television receiver further having an equalizer, the equalizer having an input and an output, said method comprising the steps of:

initiating an equalization with a binary-level slicing mode;

advancing the equalization from the binary-level slicing mode to a four-level slicing mode upon an occurrence of a first condition, and returning the equalization from the four-level slicing mode to the binary-level slicing mode upon the occurrence of a second condition;

advancing the equalization from the four-level slicing mode to an eight-level slicing mode upon an occurrence of a third condition and returning the equalization from the eight-level slicing mode to the binary-level slicing mode upon the occurrence of the second condition; and changing the equalization to a training sequence mode upon an occurrence of a no flutter condition, and upon an occurrence of a flutter condition, returning the equalization from the training sequence mode to the binary-level mode, wherein a determination of an occurrence of the flutter condition is based upon an estimate of a negative derivative of the Signal-to-Noise Ratio (SNR) at the output of the equalizer, $dS_o$, being greater than a prescribed threshold $T_4$.

2. The blind-equalization method according to claim 1, wherein the first condition is determined by a difference between the SNR at the equalizer output, $S_o$, and the SNR at the equalizer input, $S_i$, being greater than a first threshold, $T_1$, wherein the second condition is determined by a difference between $S_o$ and $S_i$ being less than $T_1$, wherein the third condition is determined by a difference between $S_o$ and $S_i$ being greater than a second threshold, $T_2$, further wherein $T_2$ is greater than $T_1$, and wherein the estimate of the negative derivative of the SNR at the output of the equalizer, $dS_o$, is obtained based upon a least-squares approximation of the derivative, further wherein the occurrence of a no flutter condition corresponds to $dS_o$ being less than the prescribed threshold $T_4$, the occurrence of a no flutter condition further including the occurrence of a fifth condition, wherein the fifth condition is determined by a difference between $S_o$ and $S_i$ being greater than a third threshold, $T_3$, further wherein $T_3$ is greater than $T_2$.

3. The blind-equalization method according to claim 2, further wherein the estimate of the negative derivative of the SNR at the output of the equalizer, $dS_o$, is obtained based upon a least-squares approximation of the derivative using first-order polynomials, wherein the estimate is given by the expression $dS_o = S_o(n-1) - S_o(n+1)$, where $S_o(n-1)$ and $S_o(n+1)$ are samples of the SNR at the equalizer output separated by one sequence sample, $S_o(n)$.

4. The blind-equalization method according to claim 2, further wherein the estimate of the negative derivative of the SNR at the output of the equalizer, $dS_o$, is obtained based upon a least-squares approximation of the derivative using second-order polynomials, wherein the estimate is given by the expression $dS_o = 2(S_o(n-2) - S_o(n+2)) + S_o(n-1) - S_o(n+1)$, where $S_o(n-1)$ and $S_o(n+1)$ are samples of the SNR at the equalizer output separated by one sequence sample $S_o(n)$, and where $S_o(n-2)$ and $S_o(n+2)$ are samples of the SNR at the equalizer output separated by three sequence samples $S_o(n-1)$, $S_o(n)$, and $S_o(n+1)$.

5. A blind-equalization method for equalization of a channel of a digital television receiver, the digital television receiver having a rejection filter corresponding to a precoder for which precoding is implemented at a television transmitter for combating co-channel interference, the television transmitter for transmitting a digital television signal, the digital television receiver further having an equalizer, the equalizer having an input and an output, said method comprising the steps of:

initiating an equalization with a blind slicing mode; and changing the equalization to a training sequence mode upon an occurrence of a no flutter condition, and upon an occurrence of a flutter condition, returning the equalization from the training sequence mode to the blind slicing mode, wherein a determination of the occurrence of the flutter condition is based upon an estimate of a negative derivative of the Signal-to-Noise Ratio (SNR) at the output of the equalizer, $dS_o$, being greater than a first prescribed threshold.

6. The blind-equalization method according to claim 5, wherein the estimate of the negative derivative of the SNR at the output of the equalizer, $dS_o$, is obtained based upon a least-squares approximation of the derivative, further wherein the occurrence of a no flutter condition corresponds to $dS_o$ being less than the first prescribed threshold and wherein a difference between $S_o$, the equalizer output, and $S_i$, the equalizer input, is greater than a second prescribed threshold.

7. The blind-equalization method according to claim 6, further wherein the estimate of the negative derivative of the SNR at the output of the equalizer, $dS_o$, is obtained based upon a least-squares approximation of the derivative using first-order polynomials, wherein the estimate is given by the expression $dS_o = S_o(n-1) - S_o(n+1)$, where $S_o(n-1)$ and $S_o(n+1)$ are samples of the SNR at the equalizer output separated by one sequence sample, $S_o(n)$.

8. The blind-equalization method according to claim 6, further wherein the estimate of the negative derivative of the SNR at the output of the equalizer, $dS_o$, is obtained based upon a least-squares approximation of the derivative using second-order polynomials, wherein the estimate is given by the expression $dS_o=2(S_o(n-2)-S_o(n+2)) +S_o(n-1)-S_o(n+1)$, where $S_o(n-1)$ and $S_o(n+1)$ are samples of the SNR at the equalizer output separated by one sequence sample $S_o(n)$, and where $S_o(n-2)$ and $S_o(n+2)$ are samples of the SNR at the equalizer output separated by three sequence samples $S_o(n-1)$, $S_o(n)$, and $S_o(n+1)$.

9. The blind-equalization method according to claim 5, wherein the blind slicing mode comprises a binary-level slicing mode.

10. An equalizer for implementing blind-equalization of a channel of a digital television digital television receiver, the digital television receiver having a rejection filter corresponding to a precoder for which precoding is implemented at a television transmitter for combating co-channel interference, the television transmitter for transmitting a digital television signal, said equalizer comprising:

an input and an output;

means for initiating an equalization with a binary-level slicing mode;

means for advancing the equalization from the binary-level slicing mode to a four-level slicing mode upon an occurrence of a first condition, and returning the equalization from the four-level slicing mode to the binary-level slicing mode upon the occurrence of a second condition;

means for advancing the equalization from the four-level slicing mode to an eight-level slicing mode upon an occurrence of a third condition and returning the equalization from the eight-level slicing mode to the binary-level slicing mode upon the occurrence of the second condition; and means for changing the equalization to a training sequence mode upon an occurrence of a no flutter condition, and upon an occurrence of a flutter condition, returning the equalization from the training sequence mode to the binary-level mode, wherein a determination of an occurrence of the flutter condition is based upon an estimate of a negative derivative of the Signal-to-Noise Ratio (SNR) at the output of the equalizer, $dS_o$, being greater than a prescribed threshold $T_4$.

11. The equalizer according to claim 10, wherein the first condition is determined by a difference between the SNR at the equalizer output, $S_o$, and the SNR at the equalizer input, $S_i$, being greater than a first threshold, $T_1$, wherein the second condition is determined by a difference between $S_o$ and $S_i$ being less than $T_1$, wherein the third condition is determined by a difference between $S_o$ and $S_i$ being greater than a second threshold, $T_2$, further wherein $T_2$ is greater than $T_1$, and wherein the estimate of the negative derivative of the SNR at the output of the equalizer, $dS_o$, is obtained based upon a least-squares approximation of the derivative, further wherein the occurrence of a no flutter condition corresponds to $dS_o$ being less than the prescribed threshold $T_4$, the occurrence of a no flutter condition further including the occurrence of a fifth condition, wherein the fifth condition is determined by a difference between $S_0$ and $S_i$ being greater than a third threshold, $T_3$, further wherein $T_3$ is greater than $T_2$.

12. The equalizer according to claim 11, further wherein the estimate of the negative derivative of the SNR at the output of the equalizer, $dS_o$, is obtained based upon a least-squares approximation of the derivative using first-order polynomials, wherein the estimate is given by the expression $dS_o=S_o(n-1)-S_o(n+1)$, where $S_o(n-1)$ and $S_o(n+1)$ are samples of the SNR at the equalizer output separated by one sequence sample, $S_o(n)$.

13. The equalizer according to claim 11, further wherein the estimate of the negative derivative of the SNR at the output of the equalizer, $dS_o$, is obtained based upon a least-squares approximation of the derivative using second-order polynomials, wherein the estimate is given by the expression $dS_o=2(S_o(n-2)-S_o(n+2)) +S_o(n-1)-S_o(n+1)$, where $S_o(n-1)$ and $S_o(n+1)$ are samples of the SNR at the equalizer output separated by one sequence sample $S_o(n)$, and where $S_o(n-2)$ and $S_o(n+2)$ are samples of the SNR at the equalizer output separated by three sequence samples $S_o(n-1)$, $S_o(n)$, and $S_o(n+1)$.

14. A An equalizer for implementing blind-equalization of a channel of a digital television receiver, the digital television receiver having a rejection filter corresponding to a precoder for which precoding is implemented at a television transmitter for combating co-channel interference, the television transmitter for transmitting a digital television signal, said equalizer comprising:

an input and an output;

means for initiating an equalization with a blind slicing mode; and means for changing the equalization to a training sequence mode upon an occurrence of a no flutter condition, and upon an occurrence of a flutter condition, returning the equalization from the training sequence mode to the blind slicing mode, wherein a determination of the occurrence of the flutter condition is based upon an estimate of a negative derivative of the Signal-to-Noise Ratio (SNR) at the output of the equalizer, $dS_o$, being greater than a first prescribed threshold.

15. The equalizer according to claim 14, wherein the estimate of the negative derivative of the SNR at the output of the equalizer, $dS_o$, is obtained based upon a least-squares approximation of the derivative, further wherein the occurrence of a no flutter condition corresponds to $dS_o$ being less than the first prescribed threshold and wherein a difference between $S_o$, the equalizer output, and $S_i$, the equalizer input, is greater than a second prescribed threshold.

16. The equalizer according to claim 15, further wherein the estimate of the negative derivative of the SNR at the output of the equalizer, $dS_o$, is obtained based upon a least-squares approximation of the derivative using first-order polynomials, wherein the estimate is given by the expression $dS_o=S_o(n-1)-S_o(n+1)$, where $S_o(n-1)$ and $S_o(n+1)$ are samples of the SNR at the equalizer output separated by one sequence sample, $S_o(n)$.

17. The equalizer according to claim 15, further wherein the estimate of the negative derivative of the SNR at the output of the equalizer, $dS_o$, is obtained based upon a least-squares approximation of the derivative using second-order polynomials, wherein the estimate is given by the expression $dS_o=2(S_o(n-2)-S_o(n+2))+S_o(n-1)-S_o(n+1)$, where $S_o(n-1)$ and $S_o(n+1)$ are samples of the SNR at the equalizer output separated by one sequence sample $S_o(n)$, and where $S_o(n-2)$ and $S_o(n+2)$ are samples of the SNR at the equalizer output separated by three sequence samples $S_o(n-1)$, $S_o(n)$, and $S_o(n+1)$.

18. The equalizer according to claim 14,
wherein the blind slicing mode comprises a binary-level slicing mode.

19. A method for receiving a digital television signal transmitted from a digital television transmitter over a channel, said method comprising the steps of providing a rejection filter corresponding to a precoder for which precoding is implemented at the television transmitter for combating co-channel interference and equalizing the channel with an equalizer, the equalizer having an input and an output, wherein said equalizing step comprises:

initiating an equalization with a binary-level slicing mode;

advancing the equalization from the binary-level slicing mode to a four-level slicing mode upon an occurrence of a first condition, and returning the equalization from the four-level slicing mode to the binary-level slicing mode upon the occurrence of a second condition;

advancing the equalization from the four-level slicing mode to an eight-level slicing mode upon an occurrence of a third condition and returning the equalization from the eight-level slicing mode to the binary-level slicing mode upon the occurrence of the second condition; and changing the equalization to a training sequence mode upon an occurrence of a no flutter condition, and upon an occurrence of a flutter condition, returning the equalization from the training sequence mode to the binary-level mode, wherein a determination of an occurrence of the flutter condition is based upon an estimate of a negative derivative of the Signal-to-Noise Ratio (SNR) at the output of the equalizer, $dS_o$, being greater than a prescribed threshold $T_4$.

20. The method according to claim 19,
wherein the first condition is determined by a difference between the SNR at the equalizer output, $S_o$, and the SNR at the equalizer input, $S_i$, a being greater than a first threshold, $T_1$,
wherein the second condition is determined by a difference between $S_o$ and $S_i$ being less than $T_1$,
wherein the third condition is determined by a difference between $S_o$ and $S_i$ being greater than a second threshold, $T_2$, further wherein $T_2$ is greater than $T_1$, and
wherein the estimate of the negative derivative of the SNR at the output of the equalizer, $dS_o$, is obtained based upon a least-squares approximation of the derivative, further wherein the occurrence of a no flutter condition corresponds to $dS_o$ being less than the prescribed threshold $T_4$, the occurrence of a no flutter condition further including the occurrence of a fifth condition, wherein the fifth condition is determined by a difference between $S_o$ and $S_i$ being greater than a third threshold, $T_3$, further wherein $T_3$ is greater than $T_2$.

21. The method according to claim 20, further wherein the estimate of the negative derivative of the SNR at the output of the equalizer, $dS_o$, is obtained based upon a least-squares approximation of the derivative using first-order polynomials, wherein the estimate is given by the expression $dS_o=S_o(n-1)-S_o(n+1)$, where $S_o(n-1)$ and $S_o(n+1)$ are samples of the SNR at the equalizer output separated by one sequence sample, $S_o(n)$.

22. The method according to claim 20,
further wherein the estimate of the negative derivative of the SNR at the output of the equalizer, $dS_o$, is obtained based upon a least-squares approximation of the derivative using second-order polynomials, wherein the estimate is given by the expression $dS_o=2(S_o(n-2)-S_o(n+2))+S_o(n-1)-S_o(n+1)$, where $S_o(n-1)$ and $S_o(n+1)$ are samples of the SNR at the equalizer output separated by one sequence sample $S_o(n)$, and where $S_o(n-2)$ and $S_o(n+2)$ are samples of the SNR at the equalizer output separated by three sequence samples $S_o(n-1)$, $S_o(n)$, and $S_o(n+1)$.

23. A method for receiving a digital television signal transmitted from a digital television transmitter over a channel, said method comprising the steps of providing a rejection filter corresponding to a precoder for which precoding is implemented at the television transmitter for combating co-channel interference and equalizing the channel with an equalizer, the equalizer having an input and an output, wherein said equalizing step comprises:

initiating an equalization with a blind slicing mode; and changing the equalization to a training sequence mode upon an occurrence of a no flutter condition, and upon an occurrence of a flutter condition, returning the equalization from the training sequence mode to the blind slicing mode, wherein a determination of the occurrence of the flutter condition is based upon an estimate of a negative derivative of the Signal-to-Noise Ratio (SNR) at the output of the equalizer, $dS_o$, being greater than a first prescribed threshold.

24. The method according to claim 23,
wherein the estimate of the negative derivative of the SNR at the output of the equalizer, $dS_o$, is obtained based upon a least-squares approximation of the derivative, further wherein the occurrence of a no flutter condition corresponds to $dS_o$ being less than the first prescribed threshold and wherein a difference between $S_o$, the equalizer output, and $S_i$, the equalizer input, is greater than a second prescribed threshold.

25. The method according to claim 24,
further wherein the estimate of the negative derivative of the SNR at the output of the equalizer, $dS_o$, is obtained based upon a least-squares approximation of the derivative using first-order polynomials, wherein the estimate is given by the expression $dS_o=S_o(n-1)-S_o(n+1)$, where $S_o(n-1)$ and $S_o(n+1)$ are samples of the SNR at the equalizer output separated by one sequence sample, $S_o(n)$.

26. The method according to claim 24,
further wherein the estimate of the negative derivative of the SNR at the output of the equalizer, $dS_o$, is obtained based upon a least-squares approximation of the derivative using second-order polynomials, wherein the estimate is given by the expression $dS_o=2(S_o(n-2)-S_o(n+2))+S_o(n-1)-S_o(n+1)$, where $S_o(n-1)$ and $S_o(n+1)$ are samples of the SNR at the equalizer output separated by one sequence sample $S_o(n)$, and where $S_o(n-2)$ and $S_o(n+2)$ are samples of the SNR at the equalizer output separated by three sequence samples $S_o(n-1)$, $S_o(n)$, and $S_o(n+1)$.

27. The method according to claim 23,
wherein the blind slicing mode comprises a binary-level slicing mode.

28. A digital television receiver for receiving a digital television signal transmitted from a television transmitter, said receiver having a rejection filter corresponding to a precoder for which precoding is implemented at the television transmitter for combating co-channel interference and an equalizer for implementing blind-equalization of a channel of said receiver, wherein said equalizer comprises:

an input and an output;

means for initiating an equalization with a binary-level slicing mode;

means for advancing the equalization from the binary-level slicing mode to a four-level slicing mode upon an occurrence of a first condition, and returning the equalization from the four-level slicing mode to the binary-level slicing mode upon the occurrence of a second condition;

means for advancing the equalization from the four-level slicing mode to an eight-level slicing mode upon an occurrence of a third condition and returning the equalization from the eight-level slicing mode to the binary-level slicing mode upon the occurrence of the second condition; and means for changing the equalization to a training sequence mode upon an occurrence of a no flutter condition, and upon an occurrence of a flutter condition, returning the equalization from the training sequence mode to the binary-level mode, wherein a determination of an occurrence of the flutter condition is based upon an estimate of a negative derivative of the Signal-to-Noise Ratio (SNR) at the output of the equalizer, $dS_o$, being greater than a prescribed threshold $T_4$.

29. The receiver according to claim 28, wherein the first condition is determined by a difference between the SNR at the equalizer output, $S_o$, and the SNR at the equalizer input, $S_i$, being greater than a first threshold, $T_1$, wherein the second condition is determined by a difference between $S_o$ and $S_i$ being less than $T_1$, wherein the third condition is determined by a difference between $S_o$ and $S_i$ being greater than a second threshold, $T_2$, further wherein $T_2$ is greater than $T_1$, and wherein the estimate of the negative derivative of the SNR at the output of the equalizer, $dS_o$, is obtained based upon a least-squares approximation of the derivative, further wherein the occurrence of a no flutter condition corresponds to $dS_o$ being less than the prescribed threshold $T_4$, the occurrence of a no flutter condition further including the occurrence of a fifth condition, wherein the fifth condition is determined by a difference between $S_o$ and $S_i$ being greater than a third threshold, $T_3$, further wherein $T_3$ is greater than $T_2$.

30. The receiver according to claim 29, further wherein the estimate of the negative derivative of the SNR at the output of the equalizer, $dS_o$, is obtained based upon a least-squares approximation of the derivative using first-order polynomials, wherein the estimate is given by the expression $dS_o=S_o(n-1)-S_o(n+1)$, where $S_o(n-1)$ and $S_o(n+1)$ are samples of the SNR at the equalizer output separated by one sequence sample, $S_o(n)$.

31. The receiver according to claim 29, further wherein the estimate of the negative derivative of the SNR at the output of the equalizer, $dS_o$, is obtained based upon a least-squares approximation of the derivative using second-order polynomials, wherein the estimate is given by the expression $dS_o=2(S_o(n-2)-S_o(n+2))+S_o(n-1)-S_o(n+1)$, where $S_o(n-1)$ and $S_o(n+1)$ are samples of the SNR at the equalizer output separated by one sequence sample $S_o(n)$, and where $S_o(n-2)$ and $S_o(n+2)$ are samples of the SNR at the equalizer output separated by three sequence samples $S_o(n-1)$, $S_o(n)$, and $S_o(n+1)$.

32. A digital television receiver for receiving a digital television signal transmitted from a television transmitter, said receiver having a rejection filter corresponding to a precoder for which precoding is implemented at the television transmitter for combating co-channel interference and an equalizer for implementing blind-equalization of a channel of said receiver, wherein said equalizer comprises:

an input and an output;

means for initiating an equalization with a blind slicing mode; and means for changing the equalization to a training sequence mode upon an occurrence of a no flutter condition, and upon an occurrence of a flutter condition, returning the equalization from the training sequence mode to the blind slicing mode, wherein a determination of the occurrence of the flutter condition is based upon an estimate of a negative derivative of the Signal-to-Noise Ratio (SNR) at the output of the equalizer, $dS_o$, being greater than a first prescribed threshold.

33. The receiver according to claim 32, wherein the estimate of the negative derivative of the SNR at the output of the equalizer, $dS_o$, is obtained based upon a least-squares approximation of the derivative, further wherein the occurrence of a no flutter condition corresponds to $dS_o$ being less than the first prescribed threshold and wherein a difference between $S_o$, the equalizer output, and $S_i$, the equalizer input, is greater than a second prescribed threshold.

34. The receiver according to claim 33, further wherein the estimate of the negative derivative of the SNR at the output of the equalizer, $dS_o$, is obtained based upon a least-squares approximation of the derivative using first-order polynomials, wherein the estimate is given by the expression $dS_o=S_o(n-1)-S_o(n+1)$, where $S_o(n-1)$ and $S_o(n+1)$ are samples of the SNR at the equalizer output separated by one sequence sample, $S_o(n)$.

35. The receiver according to claim 33, further wherein the estimate of the negative derivative of the SNR at the output of the equalizer, $dS_o$, is obtained based upon a least-squares approximation of the derivative using second-order polynomials, wherein the estimate is given by the expression $dS_o=2(S_o(n-2)-S_o(n+2))+S_o(n-1)-S_o(n+1)$, where $S_o(n-1)$ and $S_o(n+1)$ are samples of the SNR at the equalizer output separated by one sequence sample $S_o(n)$, and where $S_o(n-2)$ and $S_o(n+2)$ are samples of the SNR at the equalizer output separated by three sequence samples $S_o(n-1)$, $S_o(n)$, and $S_o(n+1)$.

36. The receiver according to claim 32, wherein the blind slicing mode comprises a binary-level slicing mode.

37. A blind-equalization method for equalization of a channel of a digital receiver, the digital receiver having a rejection filter corresponding to a precoder for which precoding is implemented at a transmitter for combating co-channel interference, the transmitter for transmitting a digital signal, the digital receiver further having an equalizer, the equalizer having an input and an output, said method comprising the steps of:

initiating an equalization with a binary-level slicing mode;

advancing the equalization from the binary-level slicing mode to a four-level slicing mode upon an occurrence of a first condition, and returning the equalization from the four-level slicing mode to the binary-level slicing mode upon the occurrence of a second condition;

advancing the equalization from the four-level slicing mode to an eight-level slicing mode upon an occurrence of a third condition and returning the equalization from the eight-level slicing mode to the binary-level slicing mode upon the occurrence of the second condition; and changing the equalization to a training sequence mode upon an occurrence of a no flutter condition, and upon an occurrence of a flutter condition, returning the equalization from the training sequence mode to the binary-level mode, wherein a determination of an occurrence of the flutter condition is based upon an estimate of a negative derivative of the Signal-to-Noise Ratio (SNR) at the output of the equalizer, $dS_o$, being greater than a prescribed threshold $T_4$.

38. A blind-equalization method for equalization of a channel of a digital receiver, the digital receiver having a rejection filter corresponding to a precoder for which precoding is implemented at a transmitter for combating co-channel interference, the transmitter for transmitting a digital signal, the digital receiver further having an equalizer, the equalizer having an input and an output, said method comprising the steps of:

initiating an equalization with a blind slicing mode; and changing the equalization to a training sequence mode upon an occurrence of a no flutter condition, and upon an occurrence of a flutter condition, returning the equalization from the training sequence mode to the blind slicing mode, wherein a determination of the occurrence of the flutter condition is based upon an estimate of a negative derivative of the Signal-to-Noise Ratio (SNR) at the output of the equalizer, $dS_o$, being greater than a first prescribed threshold.

39. An equalizer for implementing blind-equalization of a channel of a digital receiver, the digital receiver having a rejection filter corresponding to a precoder for which precoding is implemented at a transmitter for combating co-channel interference, the transmitter for transmitting a digital signal, said equalizer comprising:

an input and an output;

means for initiating an equalization with a binary-level slicing mode;

means for advancing the equalization from the binary-level slicing mode to a four-level slicing mode upon an occurrence of a first condition, and returning the equalization from the four-level slicing mode to the binary-level slicing mode upon the occurrence of a second condition;

means for advancing the equalization from the four-level slicing mode to an eight-level slicing mode upon an occurrence of a third condition and returning the equalization from the eight-level slicing mode to the binary-level slicing mode upon the occurrence of the second condition; and means for changing the equalization to a training sequence mode upon an occurrence of a no flutter condition, and upon an occurrence of a flutter condition, returning the equalization from the training sequence mode to the binary-level mode, wherein a determination of an occurrence of the flutter condition is based upon an estimate of a negative derivative of the Signal-to-Noise Ratio (SNR) at the output of the equalizer, $dS_o$, being greater than a prescribed threshold $T_4$.

40. An equalizer for implementing blind-equalization of a channel of a digital receiver, the digital receiver having a rejection filter corresponding to a precoder for which precoding is implemented at a transmitter for combating co-channel interference, the transmitter for transmitting a digital signal, said equalizer comprising:

an input and an output;

means for initiating an equalization with a blind slicing mode; and means for changing the equalization to a training sequence mode upon an occurrence of a no flutter condition, and upon an occurrence of a flutter condition, returning the equalization from the training sequence mode to the blind slicing mode, wherein a determination of the occurrence of the flutter condition is based upon an estimate of a negative derivative of the Signal-to-Noise Ratio (SNR) at the output of the equalizer, $dS_o$, being greater than a first prescribed threshold.

41. A method for receiving a digital signal transmitted from a digital transmitter over a channel, said method comprising the steps of providing a rejection filter corresponding to a precoder for which precoding is implemented at the transmitter for combating co-channel interference and equalizing the channel with an equalizer, the equalizer having an input and an output, wherein said equalizing step comprises:

initiating an equalization with a binary-level slicing mode;

advancing the equalization from the binary-level slicing mode to a four-level slicing mode upon an occurrence of a first condition, and returning the equalization from the four-level slicing mode to the binary-level slicing mode upon the occurrence of a second condition;

advancing the equalization from the four-level slicing mode to an eight-level slicing mode upon an occurrence of a third condition and returning the equalization from the eight-level slicing mode to the binary-level slicing mode upon the occurrence of the second condition; and changing the equalization to a training sequence mode upon an occurrence of a no flutter condition, and upon an occurrence of a flutter condition, returning the equalization from the training sequence mode to the binary-level mode, wherein a determination of an occurrence of the flutter condition is based upon an estimate of a negative derivative of the Signal-to-Noise Ratio (SNR) at the output of the equalizer, $dS_o$, being greater than a prescribed threshold $T_4$.

42. A method for receiving a digital signal transmitted from a digital transmitter over a channel, said method comprising the steps of providing a rejection filter corresponding to a precoder for which precoding is implemented at the transmitter for combating co-channel interference and equalizing the channel with an equalizer, the equalizer having an input and an output, wherein said equalizing step comprises:

initiating an equalization with a blind slicing mode; and changing the equalization to a training sequence mode upon an occurrence of a no flutter condition, and upon an occurrence of a flutter condition, returning the equalization from the training sequence mode to the blind slicing mode, wherein a determination of the occurrence of the flutter condition is based upon an estimate of a negative derivative of the Signal-to-Noise Ratio (SNR) at the output of the equalizer, $dS_o$, being greater than a first prescribed threshold.

43. A digital receiver for receiving a digital signal transmitted from a transmitter, said receiver having a rejection filter corresponding to a precoder for which precoding is implemented at the transmitter for combating co-channel interference and an equalizer for implementing blind-equalization of a channel of said receiver, wherein said equalizer comprises:

an input and an output;

means for initiating an equalization with a binary-level slicing mode;

means for advancing the equalization from the binary-level slicing mode to a four-level slicing mode upon an occurrence of a first condition, and returning the equalization from the four-level slicing mode to the binary-level slicing mode upon the occurrence of a second condition;

means for advancing the equalization from the four-level slicing mode to an eight-level slicing mode upon an occurrence of a third condition and returning the equalization from the eight-level slicing mode to the binary-level slicing mode upon the occurrence of the second condition; and means for changing the equalization to a training sequence mode upon an occurrence of a no flutter condition, and upon an occurrence of a flutter condition, returning the equalization from the training sequence mode to the binary-level mode, wherein a determination of an occurrence of the flutter condition is based upon an estimate of a negative derivative of the Signal-to-Noise Ratio (SNR) at the output of the equalizer, $dS_o$, being greater than a prescribed threshold $T_4$.

44. A digital receiver for receiving a digital signal transmitted from a transmitter, said receiver having a rejection filter corresponding to a precoder for which preceding is implemented at the transmitter for combating co-channel interference and an equalizer for implementing blind-equalization of a channel of said receiver, wherein said equalizer comprises:

an input and an output;

means for initiating an equalization with a blind slicing mode; and means for changing the equalization to a training sequence mode upon an occurrence of a no flutter condition, and upon an occurrence of a flutter condition, returning the equalization from the training sequence mode to the blind slicing mode, wherein a determination of the occurrence of the flutter condition is based upon an estimate of a negative derivative of the Signal-to-Noise Ratio (SNR) at the output of the equalizer, $dS_o$, being greater than a first prescribed threshold.

* * * * *